United States Patent [19]
Frazier

[11] 3,731,496
[45] May 8, 1973

[54] PHOTOELECTRIC ICE LEVEL SENSOR

[75] Inventor: Lauren L. Frazier, Louisville, Ky.

[73] Assignee: General Electric Company, Louisville, Ky.

[22] Filed: Jan. 31, 1972

[21] Appl. No.: 222,177

[52] U.S. Cl. .....................62/137, 250/214, 307/311
[51] Int. Cl. ..................................................F25c 7/00
[58] Field of Search............................307/311, 117; 250/206, 209, 214, 221, 222, 223; 62/137

[56] References Cited

UNITED STATES PATENTS

| | | | |
|---|---|---|---|
| 3,421,488 | 1/1969 | Tarter | 307/311 |
| 3,684,898 | 8/1972 | Wood | 307/311 |
| 3,453,450 | 7/1969 | Evalds | 307/311 |
| 3,660,698 | 5/1972 | Schisselbauer | 307/311 |

Primary Examiner—James W. Lawrence
Assistant Examiner—D. C. Nelms
Attorney—Walter E. Rule et al.

[57] ABSTRACT

A control circuit for a current activated thermostatic appliance control switch is presented. Current from an AC voltage source is provided through a main SCR, the gate terminal of which is connected through the emitter-base junction of an intermediate transistor to the common terminal of a low voltage rated trigger SCR and voltage dropping resistor connected in series across the AC supply. During the positive half cycle of the AC supply when the normally conducting trigger SCR is switched off in response to a predetermined external condition, current flows to the main SCR gate through the transistor emitter-base junction operating in the zener region to maintain low voltage across the trigger SCR. During negative half cycles of the AC supply the diode action of the transistor's collector base junction connected across the trigger SCR similarly maintains low voltage thereacross. The trigger SCR is shown as a light activated SCR.

5 Claims, 5 Drawing Figures

Patented May 8, 1973

PHOTOELECTRIC ICE LEVEL SENSOR

BACKGROUND OF THE INVENTION

The present invention relates to a control circuit for a current activated thermostatic appliance control switch. It is useful in controlling the operation of an automatic ice maker in which the level of ice pieces in the ice storage receptacle is indicated by a light beam. In such an arrangement, when the receptacle is filled with ice pieces, the light beam is interrupted and this triggers the control circuit of the present invention to activate the thermostatic control switch which, in turn, stops the operation of the ice maker.

One control circuit useful for this purpose has been described in copending application Ser. No. 20,077 filed Mar. 16, 1970 in the name of John E. Sterling. Briefly, the circuit in that application employs a photocell to detect the light beam used to indicate the ice piece level and a DC regulated power supply adapted to supply a low DC voltage from the incoming AC supply means. The photocell connected in series with a resistor across this low DC voltage forms a resistance bridge to control the gating of a transistor and hence the operation of an SCR, which in turn may activate a thermostatic switch, resulting in the stopping of the icemaking operation. Although this circuit has proved to be satisfactory for the purpose, the control circuit described in accordance with the present invention improves over such prior art control circuit by substituting a light-activated SCR for the photocell with a resulting gain in reliability and sensitivity. A PNP transistor is coupled so as to take advantage of its zener and conventional diode characteristics to control current flow and to effect the gating of an SCR. The circuit is coupled across the household AC lines in such an arrangement of components that many of them are subjected to very low voltage as compared with the AC line voltage. This obviates the need for a DC regulated power supply and permits the usage of low-level components with a resultant longer life expectancy.

It is therefore an object of the present invention to provide a control circuit for a current activated thermostatic appliance control switch which is inexpensive and reliable in operation.

SUMMARY OF THE INVENTION

In accordance with the present invention, a control circuit for a current activated thermostatic appliance control switch comprises means for supplying an indication of a predetermined external condition intended to initiate actuation of the thermostatic switch and means for supplying an AC voltage which includes first and second input terminals. The control circuit also includes a thermostatic heater current control SCR coupled across the input terminals of the AC supply means. Also included is a trigger SCR and a voltage dropping resistor connected in series across the input terminals, the trigger SCR adapted to be responsive to said external condition indication means to change its conduction state in response to a predetermined change in said external condition. There is further included a transistor having its base-emitter junction connected from the anode of the trigger SCR to the control gate of the control SCR and having its base-collector junction connected across the anode-cathode terminals of the trigger SCR, whereby, non-conduction of the trigger SCR causes a gating current to flow by zener action of the transistor base-emitter junction to the gate terminal of the control SCR during positive half cycles of the AC supply and reverse current during negative half cycles of the AC supply is provided by diode action of the transistor collector-base junction.

DESCRIPTION OF THE PREFERRED EMBODIMENT

Figure 1:
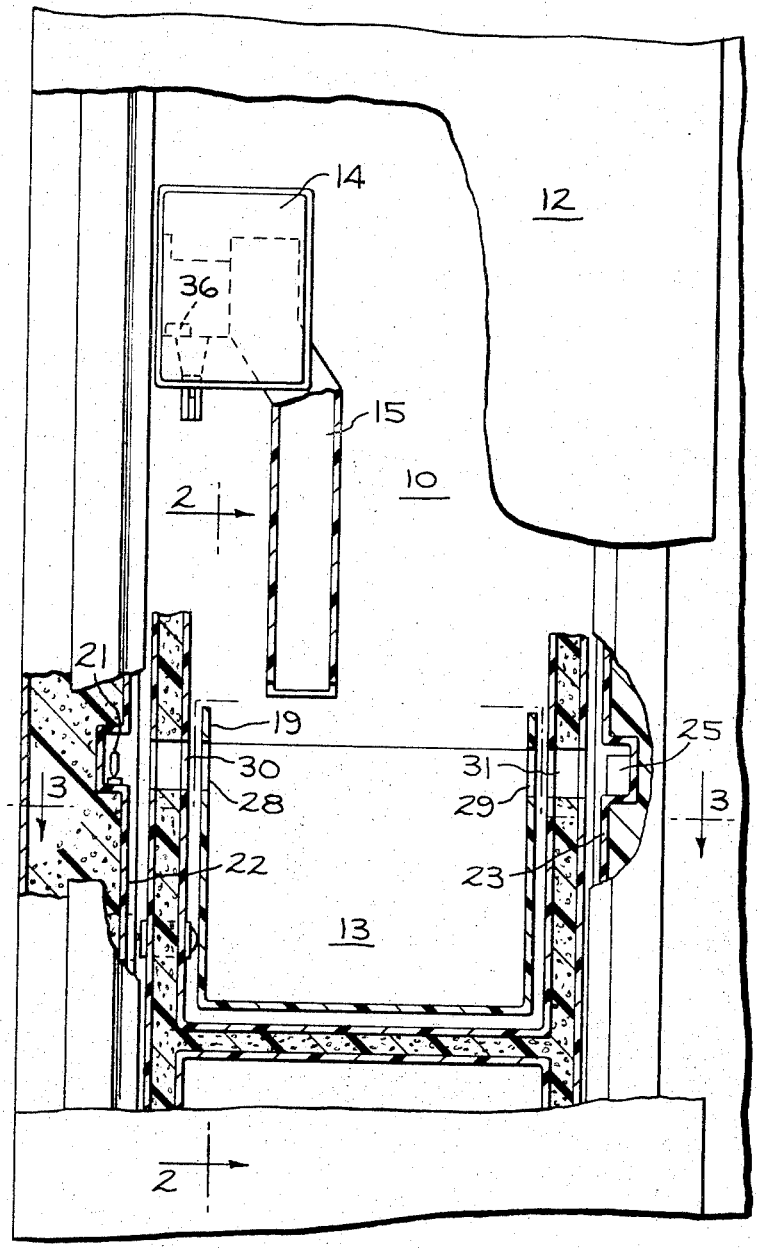
FIG. 1 is a front elevational view, partly in section, of a portion of a household refrigerator including the present invention.
Figure 2:
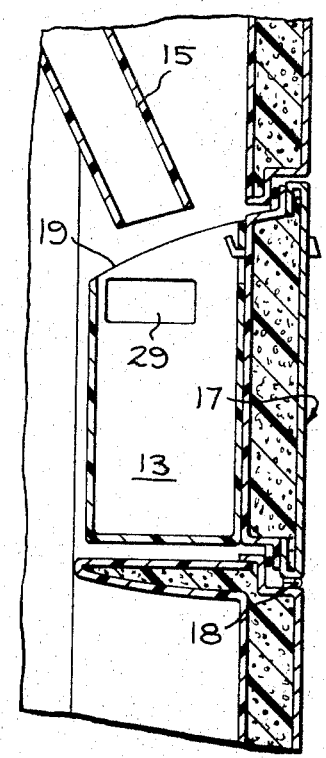
FIG. 2 is a vertical sectional view taken generally along line 2—2 of FIG. 1.
Figure 3:
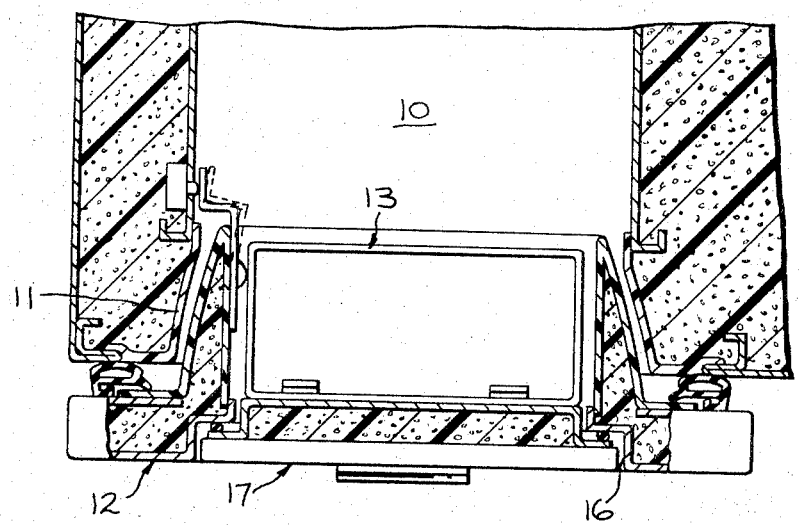
FIG. 3 is a horizontal sectional view taken generally along line 3—3 of FIG. 1.

With reference generally to FIGS. 1, 2 and 3 of the accompanying drawing, there is illustrated a household refrigerator with a freezer compartment 10 having mounted therein an automatic ice making system, the operation of which is controlled in accordance with the circuit of the present invention. An access opening at the front of the freezer compartment is closed by a door 12. The inner surface of the door 12 is shaped so as to form a storage recess on the interior surface.

An ice storage receptacle 13 is supported within this recess and an automatic ice maker 14 is supported within the freezer compartment 10 above the receptacle 13 in a position such that the ice pieces from the ice maker 14 can be conveyed by a chute 15 to the receptacle 13.

Referring to FIG. 3, door 12 is provided with a relatively small secondary access opening or passage 16 extending through the door 12 at about countertop height. This passage 16 is normally closed by a secondary or ice service door 17, the lower edge of which is hingedly supported as indicated at 18 in FIG. 2, for tilting movement about its hinged axis.

The ice storage receptacle 13 is removably supported on the inner surface of this secondary door 17 so that when secondary door 17 is tilted to its open position or when door 12 is opened, the ice stored in the receptacle may be obtained through the open top 19 of the receptacle. This through-the-door ice service may be of the type disclosed in U.S. Pat. No. 3,602,007—Drieci.

An ice maker useful in the system contemplated by the present invention may be of the type disclosed in U.S. Pat. No. 3,331,215—Shaw with the exception of the substitution of the ice level indication means of the present invention for the feeler arm ice level sensing mechanism of the Shaw structure. Referring to FIG. 1, this ice level indication means includes lamp 21 mounted on the freezer compartment frame component 22 at one side of the receptacle 13 for allowing to be directed the photoelectric triggering means, in the form of a beam of light, through and across the receptacle at a predetermined level, such as that which a desired quantity of accumulated ice pieces may reach. Also included is photo-sensitive SCR 25 positioned on the opposite freezer compartment frame component 23 and aligned so as to receive the beam of light from lamp 21. Components 21 and 25 are mounted at an elevation below the top 19 of receptacle 13, and aligned windows, in the form of slots 28 and 29, are provided in the opposing side walls of the receptacle so that the beam of light may traverse the receptacle to reach SCR 25 at that predetermined level. Similar windows 30 and 31 are provided in the inner surface of the door 12 in alignment with windows 28 and 29. The relevant portions of the ice maker circuit are shown schematically in FIG. 4 and include a motor 34 for driving the ice maker timing, harvesting and water-fill mechanism, a mold heater 35 for warming the walls of the ice mold to facilitate the release of the ice pieces therefrom and a thermostatic switch 36 for sensing the mold temperature and initially energizing the motor 34 and the mold heater 35 upon the formation of ice pieces in the ice maker mold. The motor 34 drives a timing cam 37 operating a plurality of switches during the ice harvesting cycle, one of which energizes and opens a solenoid valve 38 for supplying a fresh charge of water to the ice maker mold after the discharge of ice pieces therefrom.

When the thermostatic switch 36 senses a predetermined below freezing mold temperature, it closes and connects both the motor 34 and the mold heater 35 to the AC supply voltage means, here illustrated as lines 39 and 40. During initial operation of the motor, the cam 37 closes a first switch 41 bypassing the thermostatic switch 36 to assure continuous operation of the motor and the mold heater after the mold heater 35 has warmed the mold to a point where the thermostatic switch 36 opens. Following the discharge of ice pieces from the mold, the cam 37 closes a second switch 42 for energization of the solenoid controlled water valve 38 to supply a fresh charge of water to the mold. Further rotation of the cam opens both switches 41 and 42 thereby de-energizing both the motor and the mold heater which remain de-energized until the thermostat again senses a below freezing temperature in the mold.

Figure 4:
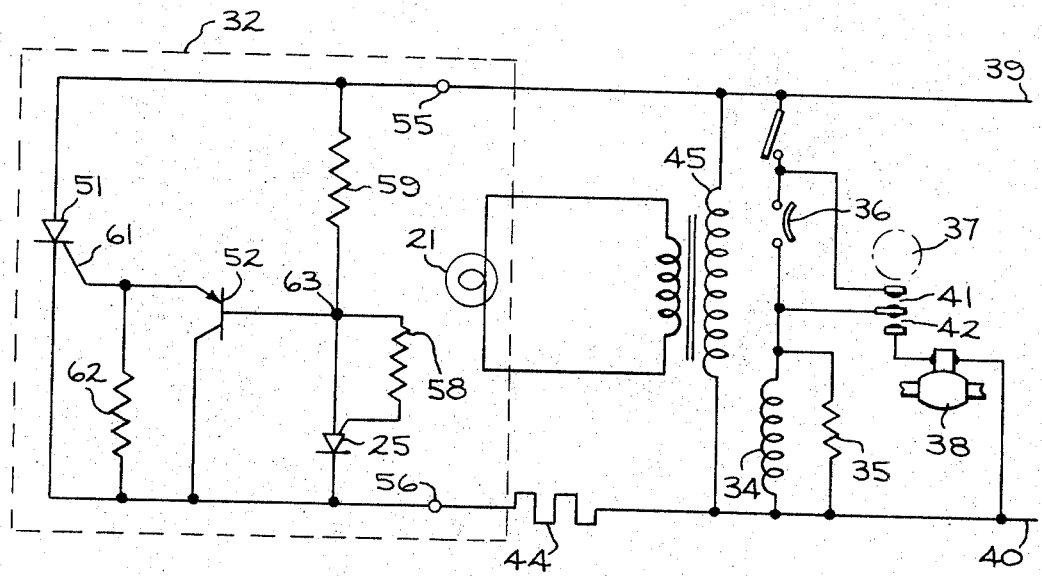
FIG. 4 is a schematic diagram of a portion of the electrical control circuitry for controlling the automatic operation of the ice maker.
Figure 5:
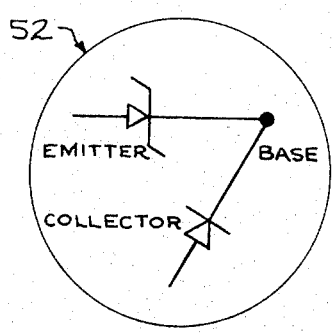
FIG. 5 shows symbolically the electrical equivalent of transistor 52 of FIG. 4.

In accordance with the present invention, control circuit 32, schematically illustrated in FIG. 4 of the drawing, interrupts this automatic ice making cycle when the ice accumulated in receptacle 13 has reached a predetermined level. More specifically, the function of circuit 32 is to provide thermostatic control current to energize heater 44 positioned adjacent to thermostatic switch 36 thereby causing switch 36 to open preventing further operation of motor 34 and mold heater 35 whenever the quantity of ice pieces in receptacle 13 reaches a predetermined level.

In the control circuit 32 of FIG. 4, means for supplying an indication of a predetermined external condition, such as the level of ice pieces in the receptacle 13, includes lamp 21 energized by a voltage step-down transformer 45. Means for supplying an AC voltage includes a pair of input terminals 55 and 56 connected to a 120 volt power source (not shown) via lines 39 and 40.

Current control SCR 51 has its anode connected to input terminal 55 and its cathode connected through input terminal 56 to thermostatic heater 44. Resistor 62 is connected across gage terminal 61 and the cathode of SCR 51 to prevent spurious gating of SCR 51.

A trigger SCR 25 and voltage dropping resistor 59 are coupled in series across the input terminals 55, 56. SCR 25 is preferably a light activated SCR and is adapted to be responsive to the beam of light from lamp 21 to be normally in the full conduction state and to change its conduction state in response to a predetermined change in the incident light beam, as when the light beam is interrupted by ice pieces in a full receptacle. Bias resistor 58 is connected from the anode to the anode gate terminal of SCR 25 and determines the level of incident light intensity at which SCR 25 conduction is changed.

Control circuit 32 further includes transistor 52 having its base-emitter junction connected from the anode of trigger SCR 25 to the gate terminal 61 of control SCR 51 to provide a gate current path to SCR 51 during positive half cycles of the AC supply voltage when SCR 25 is non-conducting. The collector-base junction of transistor 52 is connected across the anode-cathode terminals of trigger SCR 25 for a purpose to be described hereinafter.

In operation, when the level of ice pieces is below the light beam from lamp 21, the light impinges on trigger SCR 25. During the positive half cycles of the AC voltage on terminals 55, 56, i.e., terminal 55 is positive with respect to terminal 56, the radiant energy on SCR 25 causes it to be gated into conduction in accordance with well-known principles of light activated SCR operation.

In the operation of control circuit 32, during the positive half cycle of the AC supply voltage, i.e., when the voltage at terminal 55 is positive with respect to that at terminal 56, the anode-cathodes of control SCR 51 and trigger SCR 25 are forward biased. Assuming the accumulation of ice pieces in receptacle 13 is below the light path between lamp 21 and SCR 25, when the anode-cathode bias of SCR 25 is sufficiently positive, the beam of radiant energy impinging upon SCR 25 will cause it to switch to the conduction state with a voltage drop thereacross of approximately 1 volt. Since the voltage level at point 63 is below the 6 to 8 volt zener voltage of the transistor 52 base-emitter junction, essentially no gating current will flow to control gate 61 of control SCR 51. SCR 51 thus continues to block the current to heater 44.

During the negative half cycle of the AC supply voltage, SCR 25 reverts to the blocking state; the collector-base diode action of transistor 52 limits the reverse voltage on SCR 25 to approximately 0.6 volt. The relatively large value of resistor 59 prevents the current from reaching a sufficiently high value to activate heater 44.

When the level of accumulated ice in receptacle 13 is such that it blocks the light beam, SCR 25 is prevented from being switched to the conducting state during the positive half cycle of the AC voltage. As soon as the voltage at terminal 63 exceeds the zener breakdown potential of the base-emitter junction of transistor 52, current flows to the control gate 61 of SCR 51, thereby gating control SCR 51 into the conduction state allowing heater 44 to be energized. Thermostatic switch 36 will open to prevent further operation of motor 34 and mold heater 35 thereby de-activating the ice maker.

In this application, components of the present invention found satisfactory are:

| ITEM | VALUE OR NO. |
| --- | --- |
| SCR 51 | GE C103B |
| Resistor 58 | 10K ohm – 1 meg ohm |
| Resistor 59 | 33K ohm |
| Resistor 62 | 1K ohm |

PNP transistor 52 is similar to GE 2N5354 with the exception that it is not required to meet any of the conventional amplifying specifications. Trigger SCR 25 used in this application is a signal level switching device having an anode gate, similar to GE C13, but packaged in a transparent plastic envelope to permit radiant energy to impinge upon the base junctions.

It should be noted that, because of the particular connection and interrelation of PNP transistor 52 and trigger SCR 25 in conjunction with control gate 61 of control SCR 51, these components, with the exception of the anode-cathode junction of control SCR 51, are not subjected to more than ± 8 olts thus permitting the use of inexpensive non-critical low voltage rated components.

In one embodiment of the invention, the control circuit 32 is packaged in a molded transparent polycarbonate box having integrally molded therein a focusing lens for increasing the sensitivity of SCR 25 to the beam of radiant energy emitted by lamp 21. The completely packaged circuit then is mounted on freezer compartment frame component 23 in alignment with the beam of energy traversing the receptacle 13.

It will be obvious that the specific embodiment is not limited in its application to refrigerator cabinets in which the receptacle 13 is supported on the inner surface of a freezer compartment door.

Other applications are, for example, as described in U.S. Pat. No. 3,331,215—Shaw, where the receptacle is mounted immediately beneath the ice making apparatus and U.S. Pat. No. 3,561,231—Webb, where the receptacle is mounted in the refrigerator fresh food compartment door.

Accordingly, while there has been shown and described a specific embodiment of the present invention, it is to be understood that it is not limited thereto and it is intended by the appended claims to cover all such modifications as fall within the scope thereof.

What is claimed as new and desired to secure by Letters Patent of the United States is:

1. A control circuit for a current activated thermostatic appliance control switch comprising:
   means for supplying an indication of a predetermined external condition intended to initiate actuation of the thermostatic switch;
   means for supplying an AC voltage including first and second input terminals;
   a trigger SCR and a voltage dropping resistor connected in series across said input terminals, the trigger SCR adapted to be responsive to said external condition indication means to change its conduction state in response to a predetermined change in said external condition;
   a thermostatic heater current control SCR coupled across the input terminals and having a control gate terminal;
   a transistor having its base-emitter junction connected from the anode of the trigger SCR to the control gate of the control SCR and having its base-collector junction connected across the anode-cathode terminals of the trigger SCR;
   whereby, non-conduction of the trigger SCR causes a gating current to flow by zener action of the transistor base-emitter junction to the gate terminal of the control SCR during positive half cycles of the AC supply and reverse current during negative half cycles of the AC supply is provided by diode action of the transistor base-collector junction.

2. A control circuit as recited in claim 1, wherein the indication means comprises a beam of radiant energy and the trigger SCR is a photo-sensitive SCR adapted to be responsive to said beam.

3. A control circuit as recited in claim 1 wherein the transistor is a PNP transistor.

4. A control circuit for a current activated thermostatic appliance control switch comprising:
   photoelectric triggering means, including a source providing a beam of radiant energy, for supplying an indication of a predetermined external condition intended to initiate actuation of the thermostatic switch;
   means for supplying an AC voltage including first and second input terminals;
   a photo-sensitive trigger SCR and a voltage dropping resistor connected in series across said input terminals, the trigger SCR adapted to be responsive to said photoelectric triggering means to change its conduction state in response to a predetermined change in said external condition;
   a thermostatic heater current control SCR coupled across the input terminals and having a control gate terminal;
   a PNP transistor having its emitter-base junction connected from the anode of the trigger SCR to the control gate of the control SCR and having its collector-base junction connected across the anode-cathode terminals of the trigger SCR.

5. In combination with an automatic ice making system of the type having an ice maker, an ice storage receptacle and electrical control means including a heater and a thermostatic switch adapted to be responsive to the heater to control the operation of the ice maker as a function of the level of ice pieces in the receptacle, a control circuit for actuating the thermostatic switch comprising:
   means for supplying an AC voltage including first and second input terminals;
   photoelectric triggering means supplying an indication of the level of ice pieces in the receptacle intended to initiate actuation of the thermostatic switch, said triggering means including a source, connected across said input terminals, providing a beam of radiant energy positioned so as to traverse the receptacle at a predetermined level;
   a heater current control SCR for controlling actuation of the heater, said SCR being coupled across said input terminals and further having a control gate terminal;

a gating circuit for gating the heater current control SCR into conduction when the quantity of ice pieces in the receptacle reaches a predetermined level, including a photo-sensitive trigger SCR and a voltage dropping resistor coupled in series across said input terminals, said trigger SCR adapted to be responsive to the photoelectric triggering means so as to be switched to the non-conduction state when the quantity of ice pieces is above the predetermined level, and a PNP transistor having its emitter-base junction connected from the anode of the trigger SCR to the control gate of the control SCR and having its collector base junction connected across the anode-cathode terminals of the trigger SCR;

whereby, when the trigger SCR is switched to the non-conduction state, during the positive half cycle of the AC supply, a gating current is caused to flow by zener action of the base-emitter junction of the PNP transistor to the control gate of the control SCR, causing the control SCR to be switched into the conduction state, allowing current to flow to actuate the heater, which in turn actuates the thermostatic switch, thereby de-activating the ice maker.

* * * * *